April 13, 1926.
J. E. ALBINSON
EXTENSION PIPE JOINT
Filed July 22, 1925
1,580,941
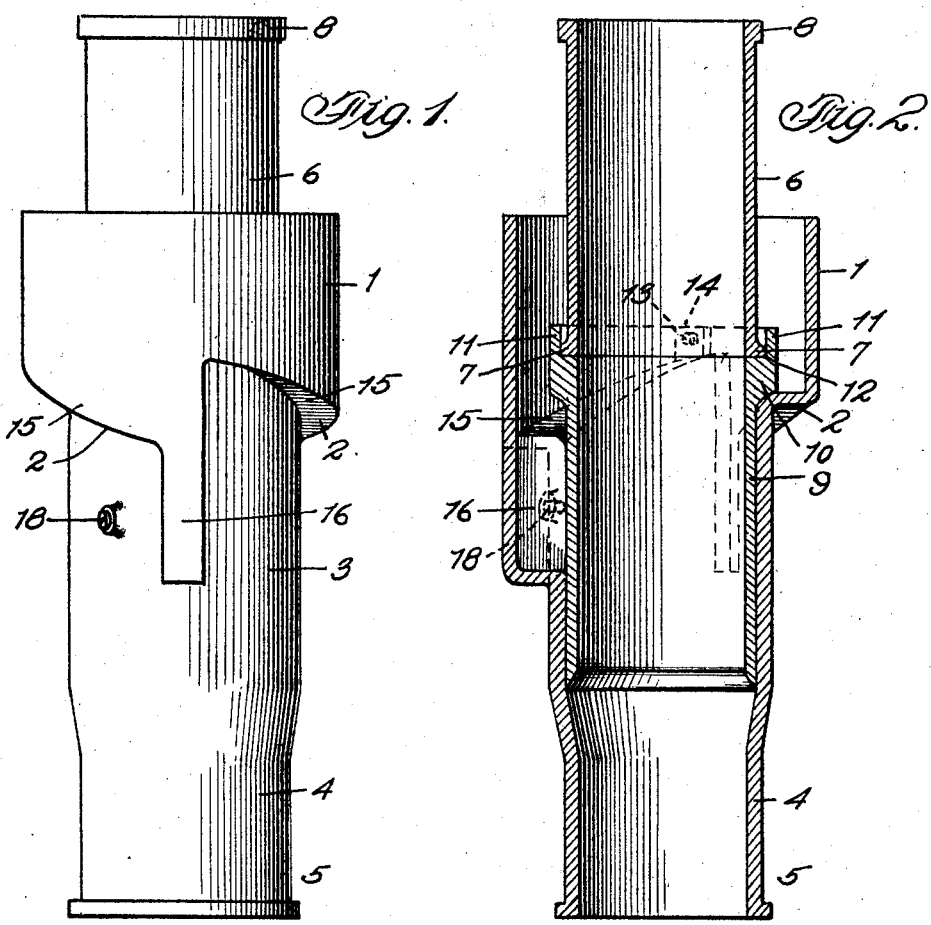
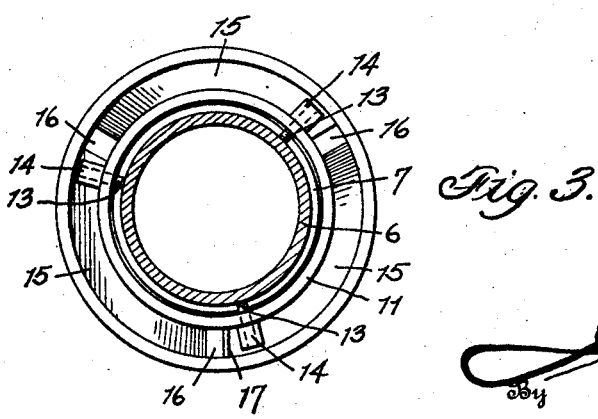
Inventor
James E. Albinson.
By
Attorney Patented Apr. 13, 1926.

1,580,941

UNITED STATES PATENT OFFICE.

JAMES E. ALBINSON, OF WASHINGTON, DISTRICT OF COLUMBIA.

EXTENSION PIPE JOINT.

Application filed July 22, 1925. Serial No. 45,402.

*To all whom it may concern:*

Be it known that I, JAMES E. ALBINSON, a citizen of the United States, residing at Washington, in the District of Columbia, have invented certain new and useful Improvements in Extension Pipe Joints, of which the following is a specification.

The object of the invention is to provide improvements in longitudinally expansible insertable pipe joints to connect pipe sections fixed with respect to each other.

Another object is to provide a joint comprising one section having a bell end, a tubular section insertable therein and having a flange, and a third section interposed between said first two sections, and provided with lugs or adjustable set-screws to co-operate with said flange, to permit turning with respect to but prevent separation from said second section, and provided with other lugs normally engageable with cam surfaces in said first section to vary the overall length of the joint, and means to fix said first and intermediate sections in operative relation with each other.

A further object is to provide in such a joint one section having a bell end, a second section or stack insertable in the bell end of the said first section, and an intermediate section operatively connecting said first sections, and extending into the narrower end portion of said first section, whereby said three sections when operatively assembled co-operate to insure a practically unbroken bore of uniform diameter extending through the joint.

Still another object is to provide a joint comprising the combination of one section having spaced cam surfaces connected by longitudinally extending recesses, and a second section having lugs adapted to enter said recesses to decrease to a minimum the overall length of said joint, and thereafter said lugs co-operating with said cam surfaces whereby as one section is rotated with respect to the other, the overall length of the joint is increased.

And a still further object is to provide in such a joint a construction embodying the above-mentioned details, but in such an arrangement as to permit the manufacture of the joint as a unit at a relatively low cost, to insure a maximum degree of efficiency for the use and operation of the joint, and to provide a ruggedness and stability designed to prevent breakage or failure to operate under all normal conditions.

With these and other objects in view, the present invention comprises additional novel details of construction and operation hereinafter fully brought out in the following description, when read in conjunction with the accompanying drawing, in which Fig. 1 is a side elevation of the exterior of one embodiment of the invention; Fig. 2 is a vertical diametrical section of the same; and Fig. 3 is a top plan view looking into the upper end of the joint.

Referring to the drawing, that embodiment of the invention herein illustrated comprises, first, a pipe section having a bell end 1, merging rather abruptly at 2 into a narrower portion 3 of relatively less diameter, and said last-named portion even tapering towards one end into a still more restricted portion 4, provided upon its lower free edge portion with a peripheral flange 5 for joining said section to another pipe section (not shown).

Into the bell end of said first section extends a pipe section or stack 6 of substantially uniform diameter, and provided upon its lower inner edge portion with a radially outwardly extending peripheral flange 7. The upper free edge portion of the pipe section 6 may also be flanged at 8, if so desired.

A third, or intermediate, pipe section 9 is provided, the smaller end portion of which extends into the intermediate portion 3 of the first-named section, while its internal bore forms a substantially unbroken continuation of the bore of the more restricted portion 4 of said first section. The normally upper portion of the section 9 is enlarged radially at 10 so as to provide a cylindrical flange 11, surrounding an annular recess 12 adapted to receive the flanged end 7 of the section 6.

The flange 11 is preferably provided with a series of spaced set-screws 13, which co-operate with the flange 7 to prevent separation of the sections 6 and 9. At circumferentially spaced intervals the flange 11 is enlarged radially to provide lugs 14, through which the set-screws 13 may extend if desired, in order to give the latter a maximum bearing surface in the member 9. The inner wall of the bell end portion 1 of said first-named section is provided with a series of circumferentially spaced cam surfaces 15, spaced from one another by longitudinally extending recesses 16, into which recesses the lugs 14 extend as far as possible when it is desired to decrease to a minimum the overall length of the joint for inserting the same between a pair of pipe sections whose position and the distance between which are fixed.

After the joint has thus been inserted, the sections 6 and 9 are pushed longitudinally outwardly from the bell end 1 of the section 3, this movement being arrested by means of one or more stops 17 carried by the upper ends of the cam surfaces and overhanging the adjacent recesses 16. Thereafter, the intermediate section 9 may be rotated in one direction with respect to the section 3, whereby, as the lugs 14 co-operate with said cam surfaces, the section 6 is forced more and more out of the bell end of the section 3 and thus increasing the overall length of the joint until it fills the space between the fixed pipes above mentioned. When this elongation of the joint has been attained, the same may be maintained permanently by means of the set-screw 18 being forced into engagement with the outer surface of the member 9. This set-screw will then hold the three sections of the joint in desired position until the usual packing is placed within the bell 1 of the pipe section 3, surrounding and uniting the same with the section 6.

In the manufacture of these pipe joints, it is common practice to make the same of cast-iron, but this is not essential inasmuch as any material may be used which may be adaptable for the purpose. Furthermore, the number of cam surfaces and co-operating lugs may be altered as desired, and the set-screws, instead of being removable, may be fixed in operative position when assembling the several parts of the joint, if this is so desired.

Furthermore, it is to be noted that the internal bore of the joint forms an almost uniform or unbroken internal diameter, so that there are no shoulders or offsets of any kind within said bore to arrest the passage of articles passing therethrough, such articles as sticks, and the like, frequently being the means of creating and building up an effective dangerous barrier to the passage of material through the joint.

It is to be understood that this improvement is to be applied to all the familiar joints used in plumbing such as Y's and T's, particularly the sanitary T's.

Having thus described my invention, what I claim and desire to protect by Letters Patent of the United States is:—

1. A pipe joint, comprising a pipe section having a bell end, a pipe section insertable in said bell end and having a peripheral flange, and an intermediate section having lugs to secure it to said second section, and extending into the smaller portion of said first section.

2. A pipe joint, comprising a pipe section having a bell end, a pipe section insertable in said bell end and having a flange, and an intermediate section having adjustable set screws to secure it to said second section, and extending into the smaller portion of said first section.

3. A pipe joint, comprising a pipe section having a cam surface, a second section having a lug normally co-operating with said surface, whereby relative rotation of said sections alters the overall length of the joint, a third section having a flange and insertable in said second section, and means to permit relative rotation but normally prevent separation of said second and third sections.

4. A pipe joint, comprising a pipe section having a plurality of cam surfaces, separated by longitudinally extending recesses, and a second section having a corresponding set of lugs adapted to enter said recesses to decrease the overall length of the joint, and said lugs when co-operating with said surfaces, and said sections being relatively rotated, serving to increase the overall length of said joint.

5. A pipe joint, comprising a pipe section having a bell end and a series of cam surfaces in said end, a second section having a peripheral flange and extending into said bell end, and a third pipe section having one end extending into and forming a substantially unbroken continuation of the smaller end of said first section, and having its other end enlarged to receive the inner end of said second section, and provided with set screws to engage said flange and normally prevent separation of said second and intermediate sections, and said last-named section being provided with lugs normally engaging said cam surfaces, whereby relative rotation of said first and said intermediate sections operates to vary the overall length of the joint.

6. A pipe joint, comprising a pipe section having a bell end and a series of cam surfaces in said end connected to one another by substantially longitudinally extending recesses, a second section having a peripheral flange and extending into and forming a substantially unbroken continuation of the smaller end of said first section, and having its other end enlarged to receive the inner end of said second section and provided with set screws to engage said flange and normally prevent separation of said second and intermediate sections, and said last-named section being provided with lugs which when extending into said recesses permit a decrease in the overall length of the joint, and which lugs when co-operating with said surfaces and rotated with respect thereto operate to increase the overall length of the joint.

In testimony whereof I have affixed my signature.

JAMES E. ALBINSON.